United States Patent [19]

Tantillo et al.

[11] 4,210,538

[45] Jul. 1, 1980

[54] FILTER BACK-WASHING

[75] Inventors: Robert M. Tantillo, Brockton, Mass.; David A. Niven, Waterbury, Conn.

[73] Assignee: Bob Baker Enterprises, Inc., Melvin Village, N.H.

[21] Appl. No.: 892,176

[22] Filed: Mar. 31, 1978

[51] Int. Cl.² ............................................. B01D 35/22
[52] U.S. Cl. .................. 210/333 A; 210/426; 210/427
[58] Field of Search ................ 210/79, 81, 82, 107, 210/106, 108, 391, 393, 323 T, 417, 418, 420, 421, 424, 333 R, 333 A, 425–427; 162/275

[56] References Cited

U.S. PATENT DOCUMENTS

| 217,442   | 7/1879  | Belcher     | 210/82    |
| 2,919,704 | 1/1960  | Butler      | 210/393   |
| 3,557,955 | 1/1971  | Hirs        | 210/82    |
| 3,703,465 | 11/1972 | Reece et al.| 210/333 A |

Primary Examiner—Frank Sever
Attorney, Agent, or Firm—Thompson, Birch, Gauthier & Samuels

[57] ABSTRACT

Apparatus for removing suspended solids from electroplating solutions and the like includes a housed cluster of slotted plastic tubes about which are fitted fabric filter sleeves and through which the solution is normally forced into the tubes continuously in the course of filtering. The process is interrupted relatively briefly when likely to be impaired by solids build-up, and flushing with water at a common utility-source pressure is then uniquely valved to take place in the reversed direction sequentially through the several sleeves by way of relatively slender sparger pipes each mated within a companion one of the slotted tubes and proportioned to spray a multiplicity of fine high-velocity streams through the slots and forcefully directly against the surrounding filter sleeving, to dislodge particulate material for drainage.

9 Claims, 8 Drawing Figures

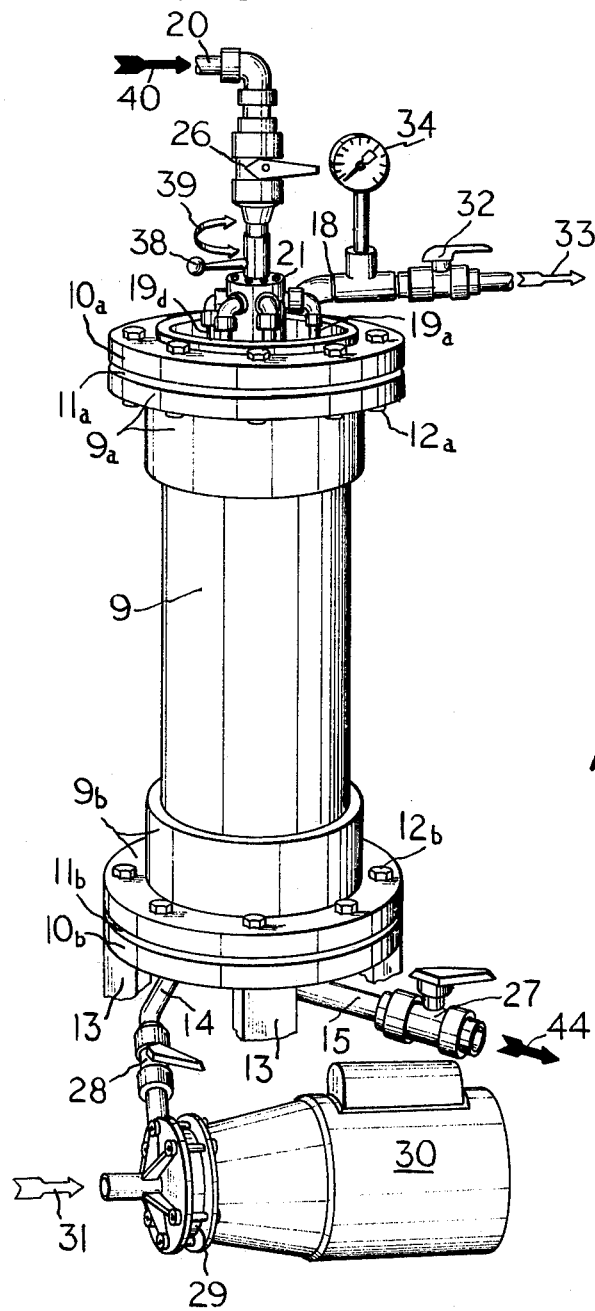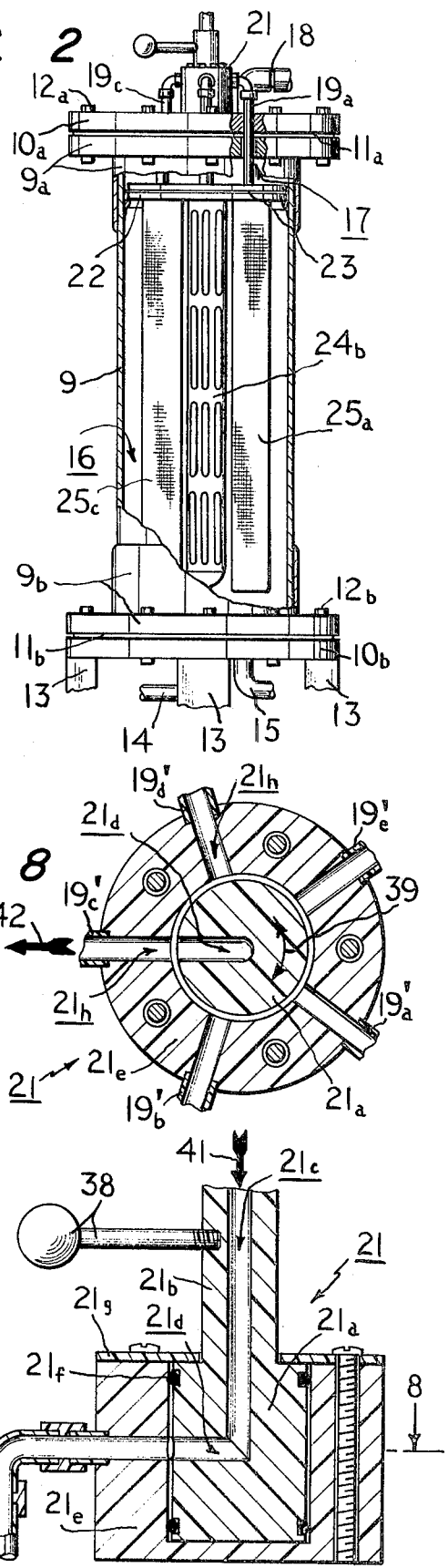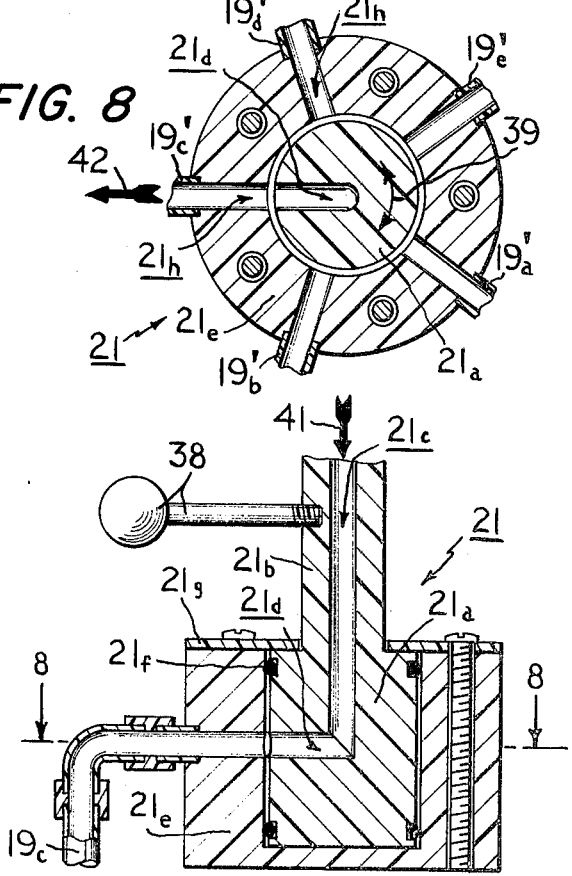

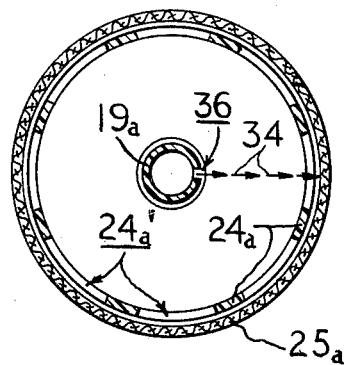
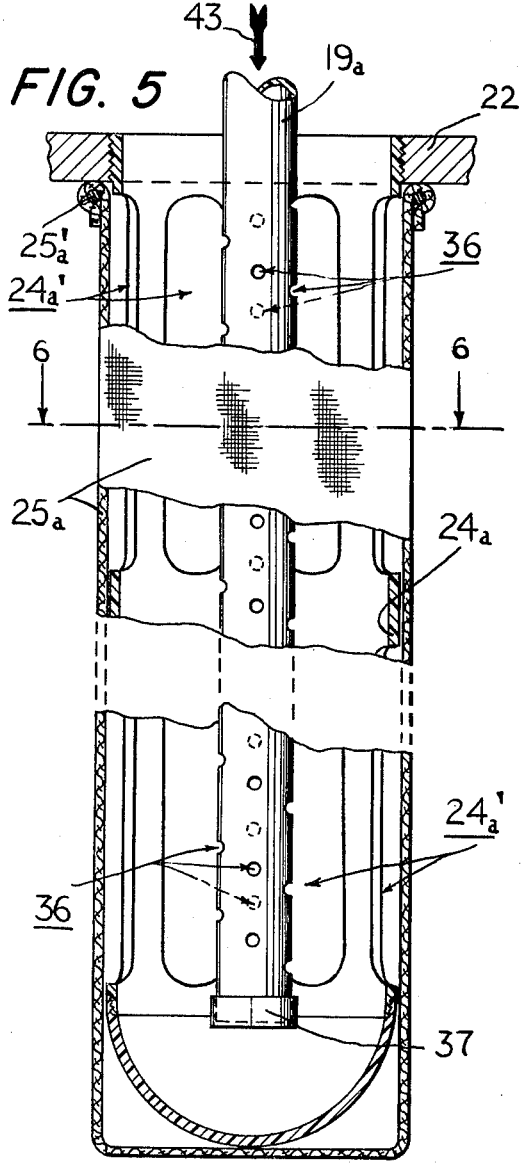
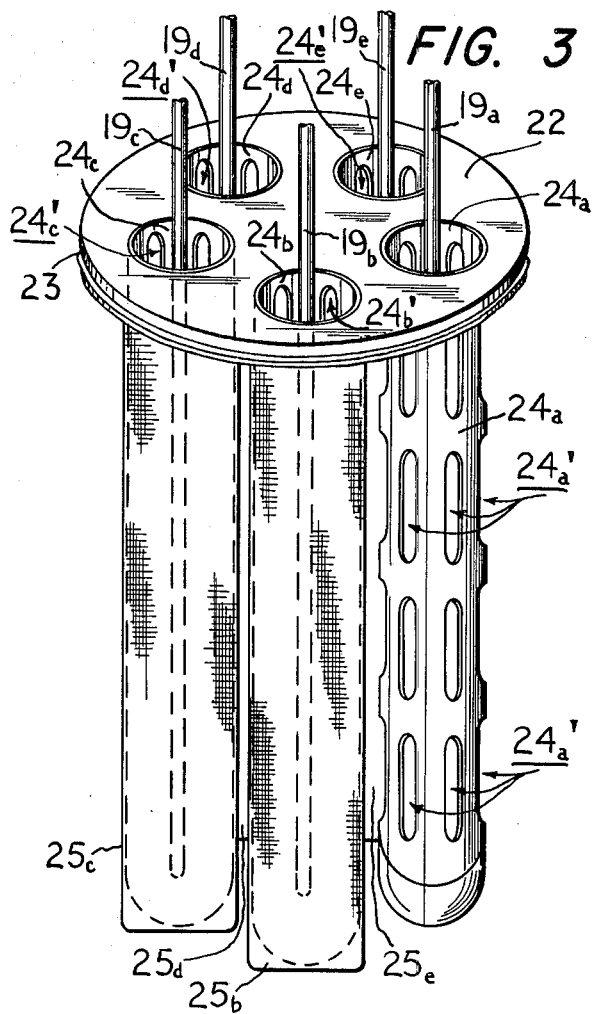
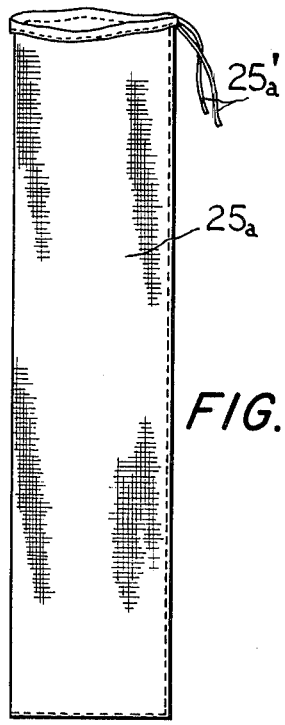

FILTER BACK-WASHING

BACKGROUND OF THE INVENTION

The present invention relates to improvements in liquid-filtering assemblies such as industrial-type solids-removal filters useful with electroplating equipment or the like, and, in one particular aspect, to the provision of unique and advantageous back-washing or reverse-flushing innovations enabling heavy-duty filter apparatus to be repeatedly reconditioned for efficient filtering without requiring frequent disassembly and attendant losses in costs, labor and operating time.

Filtering of liquids has conventionally exploited substances such as paper, cloth, masses of particles, and porous solids, through which the liquid is passed to remove suspended impurities. In some instances, it is desirable that the liquid subject to undesirable build-up of impurities be filtered on a substantially continuous basis, as is the case in industrial electroplating, where accumulations of suspended contaminants can otherwise seriously interfere with high-quality plating activities, and where operators would like to be able to run the equipment even more efficently by avoiding frequent and prolonged interruptions occasioned by need to disassemble and replenish the filtering. In the latter connection, the cleaning and/or changing of clogged filters tends to be tedious, onerous and costly, largely because the massive pressurized, sealed, and corrosion-resistant assemblies through which the liquid must be pumped require much careful manual labor in the take-apart, filter-replacement, and reassembly procedures.

It has been known to back-wash filter media on occasion, rather than to replace them every time clogging conditions develop, by forcing water or oil-free compressed air in direction opposite to the course of flow of filtered liquid, thereby physically dislodging trapped solids for subsequent removal from the upstream side of the filter material. Such back-washing or reverse-flushing is difficult to effect by means of relatively low-pressure water as taken directly from city water supplies, and particularly where there are broad areas of filtering surfaces to be flushed. For example, one known array which involves large filtering areas within confined spacing includes a cluster of essentially rigid tubes having small perforations and each closely surrounded by a limp fibrous sleeve which entraps the unwanted suspended matter from liquid which is pressurized to flow into the perforated tubes from outside the sleeve; however, when the flow is reversed in direction, only large quantities of water at very great pumping pressures, much in excess of those commonly available from municipal water supply lines, could be expected to dislodge the contamination satisfactorily.

SUMMARY OF THE INVENTION

The present invention is aimed at creating improved filtration apparatus which lends itself to heavy-duty industrial applications involving large filtering area and liquid-flow capacity, and which may be quickly and easily restored to efficient filtering status over repeated cycles without entailing frequent dismantling. In a preferred embodiment which is especially useful in the filtering of commercial electroplating solutions, a pump forces the solution into the lower portion of a fluid-tight upright cylindrical tank having an outlet for the filtered liquid at the top and an internal horizontal partitioning disk which subdivides the tank interior into upper and lower chambers. Although the partition effectively blocks liquid flow from the lower to upper chambers everywhere else, it admits of such flow through relatively large slots in side walls of several hollow closed-end elongated tubes clustered in a closely-spaced parallel array and depending from that partition into the lower chamber. Separate sleeves of non-woven fabric which will effectively filter the solution are mated about the tubes, in the lower chamber, and in the normal condition of use of the apparatus will trap suspended solids as they attempt to flow from the lower chamber and through the tube slots into the interiors of the tubes. Upon occurrence of a significant drop in pressure of the liquid discharge from the upper chamber of the apparatus, the user becomes apprised that the fabric filter sleeves are approaching clogging with entrapped solids at the sites of the tube slots, and one remedy would involve unbolting the top cover of the tank, breaking the liquid-and pressure-tight seals, removing the partition and tube clusters, separately cleaning and/or replacing the filter sleeves, and then reassembling and re-sealing the apparatus. However, a more frequent, convenient and cost-and time-saving remedy is available through back-washing or reverse-flushing with water, the forward-direction filtering flow then being cut off via valving and water being admitted from the top of the tank and sprayed forcefully in radial directions outwardly from the centers of the tubes and, through their slots, directly against interior surfaces of the fabric filter sleeves. Such spraying action is developed by relatively thin and elongated sparger tubes which have minute perforations distributed along their lengths, and which are fed from a water source through suitable valving, and which are disposed one each coaxially within a slotted tube. Preferably, the relatively low pressure of a municipal water supply is nevertheless utilized to effect the needed forceful spraying because of a valving of that supply independently to each of the thin sparger tubes, in succession, by way of a multi-port diverter valve the plug of which may be turned from outside the tank. Needle-like water jets impinging directly upon the filter-sleeve interior surfaces tend to dislodge an expel entrapped solids, which are then entrained in the outward and downward flow of water and are removed from the bottom sump portion of the tank through a drain passageway.

Accordingly, it is one of the objects of the present invention to provide novel and improved liquid-filtration apparatus in which removal of accumulated solids by back-washing is promoted by minute forceful reverse-direction sprays directed through relatively large openings in filter-support members.

Another object is to provide unique and advantageous filter assemblies in which large surface areas of fibrous filter material may be quickly and effeciently unclogged periodically by valving flow of back-washing fluid through needle-spray orifices which direct the fluid against the filter material at high velocity.

Further, it is an object to improve industrial-type filtration apparatus such that manual sequential valving of water from a relatively low-pressure source to needle spray sparger pipes within clustered tube-supported filter sleeves will rapidly and effectively flush out entrapped solids and prolong uses of the apparatus between times when dismantling and filter replacements are required.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a pictorial view of an improved industrial-type liquid-filtering assembly, including unique provisions for back-washing or flushing;

FIG. 2 is a side view, with portions broken away, of portions of a filtering assembly like that of FIG. 1;

FIG. 3 illustrates a cluster of slotted filter tubes and associated mounting plate, filter bags, and internal sparger pipes, such as are employed in the assembly of FIGS. 1 and 2;

FIG. 4 portrays a typical filter bag suitable for use with a slotted filter tube like those appearing in FIGS. 2 and 3;

FIG. 5 provides a side view in enlarged relation to showings in FIGS. 2 and 3, of a combination of a slotted filter tube, filter bag, and spirally-perforated sparger pipe used for back-washing, portions of the combination being broken away and cross-sectioned;

FIG. 6 is a transverse cross-section taken in the direction and location of section line 6—6 in FIG. 5;

FIG. 7 is a cross-sectional representation of a diverter valve useful in the porting of back-washing fluid to sparger pipes of the apparatus of FIGS. 1–3, 5 and 6; and FIG. 8 provides a transverse cross-section of the same diverter valve, taken along section line 8—8 in FIG. 7.

DETAILED DESCRIPTION OF THE PREFERRED EMBODIMENTS

Having reference to the drawings, wherein like reference characters designate identical or corresponding units and components throughout the several views, and more particularly to FIGS. 1 and 2 thereof, one embodiment of an improved back-washing filter assembly is shown to include a generally-cylindrical, upright, sturdy, corrosion-proof tank 9 united with upper and lower end flanges 9a and 9b, respectively, which are in turn sealed with end caps 10a and 10b by way of gasketing 11a and 11b and separable fasteners such as 12a and 12b. The lower end of the tank rests upon spaced-apart support elements, 13, between which are accommodated a fluid-inlet pipe 14 and a drain pipe 15, both of which form liquid-conducting couplings with the lower interior chamber 16 of the tank through sealed joints (not appearing in the drawings) with bottom end cap 10b. At the top, an upper interior chamber 17 of the tank is coupled with an outlet pipe 18 similarly sealed with upper end cap 10a, and, as is described in further detail later herein, an array of reverse-flushing inlet pipes, 19a–19c is also sealed with upper end cap 10a, to couple flushing water into the upper tank chamber from a supply line 20 via a multi-port rotary diverter valve 21.

Within the tank, and dividing it into the lower and upper chambers 16 and 17, are a horizontal partitioning disk 22, sealed with the tank interior by a peripheral O-ring 23 and supporting a plurality of depending slotted filter tubes 24a–24c, the latter being fitted externally with closely-surrounding sleeves of nonwoven filter material, 25a–25c. In normal usage, for the removal of suspended solids from an electroplating solution or the like, the ball valves 26 and 27 associated with water inlet 20 and drain 15 are both maintained closed, while the contaminated solution is admitted to lower tank chamber 16 as permitted by the opened condition of a ball valve 28 appearing between inlet pipe 14 and the outlet of a centrifugal pump 29 rotated at such times by a suitable electric motor 30. The input of liquid which is to be filtered, is characterized by arrow 31 in FIG. 1, leading into the intake of pump 29. Such solution, or other liquid, fills lower tank chamber 16, and, being pressurized, is forced through the filter material of sleeves 25a–25e and through the slots in side walls of the filter tubes 24a–24e into those tubes and, thence, upwardly through upper chamber 17 and outwardly through outlet pipe 18 and the opened outlet ball valve 32. Arrow 33 characterizes the outlet of liquid, which is there in a cleansed condition, lacking suspended solids such as metallic fines, organic materials, rust, paint, and so forth which may have been picked up by the solution in the course of electroplating operations; that cleansed liquid is recycled for further use. A pressure gage 34, sensing and displaying the pressure status of liquid from outlet pipe 18, serves to notify the user when that pressure has dropped significantly, a condition which attends heavy clogging of the filter material of the sleeves.

Solids entrapped by the filter sleeves may be rather firmly held by that material, and only some of them can be expected to become dislodged upon a mere reversal of the direction of flow. Such back-washing or reverse-flushing is of course to be conducted with substantially clean liquid which is compatible with the solution normally being cleansed and will not itself constitute a contaminant when forward-direction flow and filtering are resumed. Many municipal water supplies are suitable as sources of reverse-flushing liquid, for solutions which are not adversely affected by the introduction of some moisture which may remain in the tank, although such supplies are generally at relatively low pressure which does not allow the user to force a back-wash of water through very large areas of filter material. The latter type of difficulty becomes more severe as the filtration area is increased, and the cluster of sleeved tubes 24a–24c is an example of much filtration area compacted into relatively small space. However, improvement results from the generation of relatively small sprays or jets which will impinge directly upon the filter material and will act with sufficient force to dislodge more of the entrapped solids material and entrain the same in downwardly-draining reversed flow. That action is promoted by the formation of relatively large and numerous openings through the side walls of the filter tubes, and by directing the reversed flow through relatively small sparger pipes located within the tubes and having small orifices distributed along their lengths to produce needle-like discharges which will pass through side walls of the filter tubes and strike the filter sleeving outside. Further, the desired actions are heightened by valving the supply of flushing water to flow to less than all of the sparger tubes, such as one at a time, in sequence, to increase both the quantity and velocity of flow from each spray jet.

Each of the clustered filter tubes 24a–24e is closed at its lower end, and is preferably rounded there to promote its intended mating with one of the bags or sleeves of filter material, 25a–25e. A suitable filter bag or sleeve, 25a, shown in FIG. 4, may typically be made of nonwoven polypropylene felt, or of Dynel synthetic, and may be fastened in the intended surrounding relationship to a filter tube with the aid of a tie cord, 25a'. Rather than having small perforations or pores, the filter tubes are provided with many and relatively large openings, shown as slots, 24a-24e. In one example, each of the filter tubes may have elongated slots which are about one-half inch wide, circumferentially, and eight rows of such slots may be evenly spaced around the tube, with four such slots being arrayed longitudinally in closely-spaced relationship along each row. A relatively large filter assembly may typically include filter tubes about twenty inches long and two inches in diameter, and the tubes for a larger filter may be twice that length and three inches in diameter. As appears in FIG. 3, for example, the preferred slotting of a filter tube affords large openings across which the filter sleeving can be drawn while yet providing a supporting form or framework which will prevent the sleeving from collapsing or bunching and thereby failing to perform as well as intended.

Such large openings in the side walls of the filter tubes insure that correspondingly large areas of the interior surfaces of the filter bags or sleeves are directly exposed for impingements thereon by reverse-flushing liquid-spray jets such as the jet symbolized by dashed arrowheaded linework 34 in FIG. 6. That jet is one of a multiplicity of minute needle-like streams which issue from small orifices 36 distributed at least along the length of sparger pipe 19a which lies within the axial span of the rows of slots 24a through the surrounding filter tube 24a. Preferably, the orifices 36 are distributed along a helical pathway, as shown in FIG. 5, and are quite numerous, such that the many spray streams may reach much of the exposed areas of the filter sleeves. In the case of a ⅜ inch diameter sparger pipe about twenty-three inches long, and mated coaxially within a filter tube about two inches in diameter, about thirty-five 1/16 inch diameter orifices may be satisfactory, and about sixty-three such orifices will have the intended effects with a ½ inch diameter sparger pipe about forty-three inches long and mated coaxially within a three-inch diameter filter tube. Each sparger pipe is otherwise closed, to cause the applied source pressure to remain high at the sites of the orifices and thereby develop forceful jets of cleansing spray; cap 37 therefore closes the lower end of sparger pipes 19a shown in FIG. 5, and it should be understood that the other sparger pipes serving the tube cluster are similarly capped and provided with like orifices, and so forth.

In acting to discharge liquid-spray very close to the "back" surfaces of the filter medium, the several sparger pipes tend to improve the reverse-flushing cleaning actions in relation to what would be the case if the upper tank chamber 17 were simply filled and the cleansing liquid caused to ooze through the tubes and sleeves. However, in promoting sprays with significantly increased force, which will act to dislodge entrapped solids more effectively, the available liquid-source pressure is concentrated in each of the sparger pipes independently, and in succession. For that purpose, the several sparger pipe inlets are coupled to outlet ports of the multi-port rotary diverter valve 21 (FIGS. 8 and 7), the central rotor or plug 21a of which is integral with an upstanding stem 21b having a central inlet passageway 21c which merges with a radial exit passageway 21d leading to the outer periphery of the plug. That cylindrical plug is fitted closely within an accommodating bore in the outer valve body 21e, and is sealed with it at least about the upper periphery by an O-ring 21f, the cover plate or bonnet element 21g serving to retain the plug nested within the valve body. At equi-angularly spaced radial positions, the valve body 21e is provided with radial passageways 21h, preferably equal in number to the number of sparger pipes to be served, and coupling elements 19a-19e connect those passageways to the inlets for the respective sparger pipes. A handle 38 associated with valve stem 21b enables the user to rotate the plug to angular positions wherein its exit passageway 21d is substantially aligned with selected ones of radial passageways 21h, and the stem 21b is of course coupled with the downstream side of inlet ball valve 26 (FIG. 1) by way of a sealed rotary coupling of a known type (not specifically illustrated) so that the selected positions may be approached in angular directions of arrows 39 (FIGS. 1 and 8). Although the individual valve outlet passageways 21h may be tightly sealed against leakage between passageways, a close fit between plug and surrounding body suffices to produce only high pressure-drop leakages and thereby suffices to insure that substantially all of the input is forced through but one outlet passageway and one sparger pipe at a time. The auxiliary inlet ball valve 26 is therefore relied upon to achieve full cut-off of cleaning liquid when reverse-flushing is not being performed.

When back-washing or flushing is to be carried out, the inlet valve 28 and outlet valve 32 which were open during normal filtering are first closed, and the drain valve 27 and water-supply inlet valve 26 are opened. Arrows 40 through 44 (FIGS. 1,5,7, and 8) characterize the flow of the flushing water from a city source, through the diverter valve stem and out of the valve body, through a sparger tube, and finally out of the drain which will empty the solids-carrying water from the lower tank chamber 16, to ready the assembly for further filtering. The cleaning process may be repeated until such wear or permanent contamination occurs as to require that the filter bags or sleeves be replaced. On the latter occasions, the tank cover 10a, with sparger pipes undisturbed, may be unbolted and lifted cleanly out of the filter-tube cluster, before the latter is removed.

Depending upon the corrosiveness of solutions which are to be filtered, the various components of the assembly may be required to be of or to be protectively coated with corrosion-resistant material. Plastic filter tubing and sparger piping, of material such as polyvinylchloride, PVC, meets the needs of corrosive electroplating solutions, for example. In cases where the difficulties in manipulating separate valves can be tolerated, the inlet supply may be caused to be diverted to the sparger pipes one or only a few at a time by way of separate valves, rather than by a single rotary diverter valve having multiple parts. Accordingly, it should be understood that various modifications, combinations, and substitutions may be effected by those skilled in the art without departure in spirit or scope from this invention in its broader aspects, and that, in connection with this specification, the specific embodiments and practices herein described have been presented by way of disclosure rather than limitation upon the invention and its expressions by way of the appended claims.

What we claim as new and desire to secure by Letters Patent of the United States is:

1. Filtration apparatus which comprises in combination, a liquid-tight housing, means within said housing dividing the interior thereof into two chambers and having relatively large openings therethrough adapted to be closed on one side by flexible porous filter material, means for supporting a flexible layer of porous filter material on said one side of said dividing means and in one of said chambers in closing relation to and extending across said openings, means for introducing into said one of said chambers a fluid which is to be filtered, means for withdrawing filtered fluid from the other of said chambers, fluid-spraying conduit means disposed in said other of said chambers in proximity to said openings and having an outlet and a plurality of minute spray-forming orifices oriented to direct jets of fluid through said openings and directly onto filter material extending across said openings, means for interrupting introduction of fluid into said one of said chambers and withdrawal of fluid from said other of said chambers, means for introducing pressurized flushing fluid into said inlet of said fluid-spraying conduit, and means for withdrawing the flushing fluid and filtered contaminants entrained therein from said one of said chambers, whereby contaminants filtered by said layer of material may be dislodged therefrom and drained upon interrupting said introducing of fluid which is to be filtered and instead forcing jets of flushing fluid against said material in a reversed direction from said spray-forming orifices while preventing said contaminants from entering said other of said chambers.

2. Filtration apparatus as set forth in claim 1 wherein said spray-forming conduit means includes a plurality of conduits each having a plurality of said minute spray-forming orifices therein and each disposed in proximity with a different set of said openings through said dividing means.

3. Filtration apparatus as set forth in claim 2 wherein said means for introducing pressurized flushing fluid into said fluid-spraying means includes valve means for selectably coupling the pressurized flushing fluid into each of said plurality of conduits independently.

4. Filtration apparatus as set forth in claim 3 wherein said valving means comprises a manually-operated multi-port valve for coupling a source of said pressurized fluid into each of said plurality of conduits independently and sequentially.

5. Filtration apparatus which comprises, in combination, a liquid-tight substantially cylindrical tank, partitioning means within said tank dividing it into two axially-spaced chambers, said partitioning means including a cluster of substantially rigid laterally-spaced tubular members extending into one of the chambers and having relatively large openings through the side walls thereof, each of said tubular members supporting a sleeve of flexible porous filter material in a surrounding closely-mated relationship therewith wherein said porous filter material extends across and closes said openings, means for introducing into said one of said chambers from outside said tank a liquid from which suspended contaminants are to be filtered, means for releasing from said tanks filtered liquid which accumulates in the other of said chambers, a plurality of sparger pipes extending one each coaxially into said tubular members, each having an inlet and a plurality of minute spray-forming orifices therethrough distributed along the portions thereof within said members and oriented to direct jets of liquid through said openings and directly onto said filter material which extends across said openings, means for interrupting the introduction of liquid into said one of said chambers and the release of filtered liquid from the other of said chambers, means for introducing pressurized flushing liquid from a supply main outside said tank into an inlet of each of said sparger pipes, and means for draining flushing liquid and filtered contaminants entrained therein from said one of said chambers, whereby contaminants filtered by the sleeves of filter material may be dislodged therefrom and drained when said sparger pipes spray said jets of flushing liquid against said filter material through said openings through side walls of said tubular members while preventing said contaminants from entering said other of said chambers.

6. Filtration apparatus as set forth in claim 5 wherein said means for introducing pressurized flushing liquid includes valve means for selectably coupling said pressurized flushing liquid into each of said sparger pipes independently.

7. Filtration apparatus as set forth in claim 6 wherein said valve means comprises a manually-operated multi-port valve for coupling a municipal water supply line into each of said plurality of sparger pipes independently and sequentially, each of said sparger pipes being closed at its downstream end.

8. Filtration apparatus as set forth in claim 7 wherein said openings through side walls of said tubular members are in the form of elongated slots, wherein said openings are distributed over substantially all of peripheral surfaces of said tubular members, and wherein a multiplicity of said spray-forming orifices are distributed along a substantially helical path along each of said sparger pipes.

9. Filtration apparatus as set forth in claim 8 wherein said multi-port valve includes a central manually-rotatable plug member having a radial passageway for coupling the water supply line with each of a plurality of radial passageways in a surrounding valve body each connected with a different one of said sparger pipes, and separate valves for connecting said supply line with said plug member passageway and for opening and closing the passageways by which liquid is introduced into and drained from said one of said chambers and is released from the other of said chambers.

* * * * *

UNITED STATES PATENT AND TRADEMARK OFFICE
CERTIFICATE OF CORRECTION

PATENT NO. : 4,210,538
DATED : July 1, 1980
INVENTOR(S) : Robert M. Tantillo and David A. Niveu It is certified that error appears in the above-identified patent and that said Letters Patent are hereby corrected as shown below:

Claim 1, Column 7, Line 14, "outlet" should read -- inlet --.

Signed and Sealed this

Second Day of December 1980

[SEAL]

Attest:

SIDNEY A. DIAMOND

Attesting Officer

Commissioner of Patents and Trademarks